United States Patent
Estrella et al.

(10) Patent No.: US 6,695,485 B1
(45) Date of Patent: Feb. 24, 2004

(54) BEZEL FOR FIBER OPTIC COMPONENTS

(75) Inventors: Jeffrey Estrella, Tewksbury, MA (US); George Ashouri, Wheaton, IL (US)

(73) Assignee: Tellabs Operations, Inc., Naperville, IL (US)

( * ) Notice: Subject to any disclaimer, the term of this patent is extended or adjusted under 35 U.S.C. 154(b) by 30 days.

(21) Appl. No.: 09/628,348

(22) Filed: Jul. 28, 2000

(51) Int. Cl.[7] .................................................. G02B 6/36
(52) U.S. Cl. ........................................... 385/53; 385/77
(58) Field of Search ................................ 385/53, 54, 55, 385/60, 77, 78; 439/553, 557

(56) References Cited

U.S. PATENT DOCUMENTS

| | | | |
|---|---|---|---|
| 3,781,537 A | | 12/1973 | Ramsey .................... 240/8.16 |
| 4,261,640 A | | 4/1981 | Stankos et al. .......... 350/96.15 |
| 4,611,887 A | * | 9/1986 | Glover et al. ................. 385/71 |
| 4,753,511 A | | 6/1988 | Bowers et al. .......... 350/96.21 |
| 4,900,124 A | | 2/1990 | Lampert et al. .......... 350/96.21 |
| 4,960,317 A | * | 10/1990 | Briggs et al. ................. 385/56 |
| 5,046,956 A | * | 9/1991 | Takano ........................ 439/78 |
| 5,073,046 A | * | 12/1991 | Edwards et al. .............. 385/90 |
| 5,082,345 A | * | 1/1992 | Cammons et al. ............ 385/60 |
| 5,124,506 A | * | 6/1992 | Briggs et al. ................ 174/67 |
| 5,222,908 A | * | 6/1993 | Baker, III et al. .......... 439/557 |
| 5,274,729 A | * | 12/1993 | King et al. ................. 385/134 |
| 5,542,015 A | * | 7/1996 | Hultermans ................. 385/60 |
| 5,734,770 A | | 3/1998 | Carpenter et al. ............ 385/72 |
| 5,734,778 A | | 3/1998 | Loughlin et al. ........... 385/140 |
| 5,748,819 A | | 5/1998 | Szentesi et al. .............. 385/60 |
| 5,810,614 A | * | 9/1998 | Ruch .......................... 439/557 |
| 5,876,246 A | * | 3/1999 | Martin et al. ............... 439/557 |
| 5,887,100 A | * | 3/1999 | Robertson .................... 385/76 |
| 5,896,477 A | * | 4/1999 | Stephenson et al. .......... 385/53 |
| 5,930,426 A | * | 7/1999 | Harting et al. ................ 385/56 |
| 5,956,444 A | * | 9/1999 | Duda et al. ................... 385/53 |
| 6,081,647 A | * | 6/2000 | Roth et al. .................. 385/139 |
| 6,149,315 A | * | 11/2000 | Stephenson .................. 385/60 |
| 6,186,670 B1 | * | 2/2001 | Austin et al. ................. 385/55 |
| 6,302,592 B1 | * | 10/2001 | Zullig .......................... 385/60 |
| 6,354,746 B1 | * | 3/2002 | Lee ............................. 385/77 |
| 6,447,172 B1 | * | 9/2002 | Stephenson et al. .......... 385/70 |
| 6,508,593 B1 | * | 1/2003 | Farnsworth et al. .......... 385/55 |

\* cited by examiner

*Primary Examiner*—Hae Moon Hyeon
(74) *Attorney, Agent, or Firm*—Fitzpatrick, Cella, Harper & Scinto

(57) ABSTRACT

A bezel for facilitating the connection between an external device positioned on one side of a communication panel and a module located on the other side of the panel where the panel has an opening for receiving the bezel. The bezel includes a housing defining an interior portion of the bezel, a first open end for insertion into the opening of the panel and the module, where the first open end receives a first communication connection from the module for connection with the external device, and a second open end having a removable cover. The second open end receives a second communication connection from the external device for connection with the first communication connection.

52 Claims, 2 Drawing Sheets

BEZEL FOR FIBER OPTIC COMPONENTS

FIELD OF THE INVENTION

The present invention relates to a bezel for connection of optical components to an optical coupler. More particularly, the present invention relates to a bezel for connecting an optical attenuator to an optical coupler.

BACKGROUND OF THE INVENTION

Connectors for optical fiber transmission systems are known in the art. Often times it becomes necessary to arrange a plurality of optical fiber connectors in a panel to facilitate multifiber connections. Desirably, devices for holding connectors are mounted in the panel but the connectors themselves are not connected to incoming or outgoing fiber paths until needed to provide service. Commonly used devices which are used to accommodate interconnections are referred to as couplings.

A very much used connector for terminating and connecting two optical fibers is one which is referred to as an SC connector. An SC connector is connected to another SC connector from a module through an SC coupling by linear motion only.

Many optical fiber communication systems require a method of decreasing optical power at a reducing station to avoid the saturation of receivers. Such a reduction in power may be accomplished by introducing into the system a device known as an attenuator which is designed to dissipate or to attenuate a controlled fraction of the input power while allowing the balance to continue through the system. Such an attenuator is disclosed in U.S. Pat. No. 5,082,345 in the names of R. R. Cammons, A. W. Carlisle and N. R. Lampert.

Typically, an attenuator is attached to an SC optical coupler which is attached to a communication module within a control panel; attenuators are very often not included on an optical communication module until a connection is required. This is because depending upon the connection, a different strength optical signal may be required. At the time a connection is required, the panel is opened, and the module containing the SC optical coupler is removed so that an appropriate attenuator may be connected.

This method of installing an attenuator is very laborious and requires that the communication module from which the SC optical coupler is connected to be placed temporarily out of service.

Thus, there exists the need to be able to attach an attenuation device to the module without having to take the module out of service.

SUMMARY OF THE INVENTION

The present invention addresses the above concern and presents a new and novel device for facilitating the connection of an external optical component to a panel. Moreover, the present invention lends itself to connection of an attenuation device to an optical coupler without disrupting an optical module.

In one aspect of the present invention, a bezel for facilitating the connection of an optical connector between an optical couple positioned on a module within a panel.

The bezel includes a housing, a first end for insertion into the panel, an interior portion positioned within the housing for positioning of an optical coupler and a second end having a removable cover concealing an opening. The opening exposes an end of the optical coupler positioned within the interior of the bezel for connection to the external device.

In another aspect of the present invention, the above described bezel may be used in conjunction with a fiber optical connection panel which includes a communication module including a fiber optical connector for making a connection with an external optical device, and connection surface adjacent the module having an opening corresponding to the connector. The bezel according to the present invention is positioned within the opening and facilitates the optical connection between the connector and the external device.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
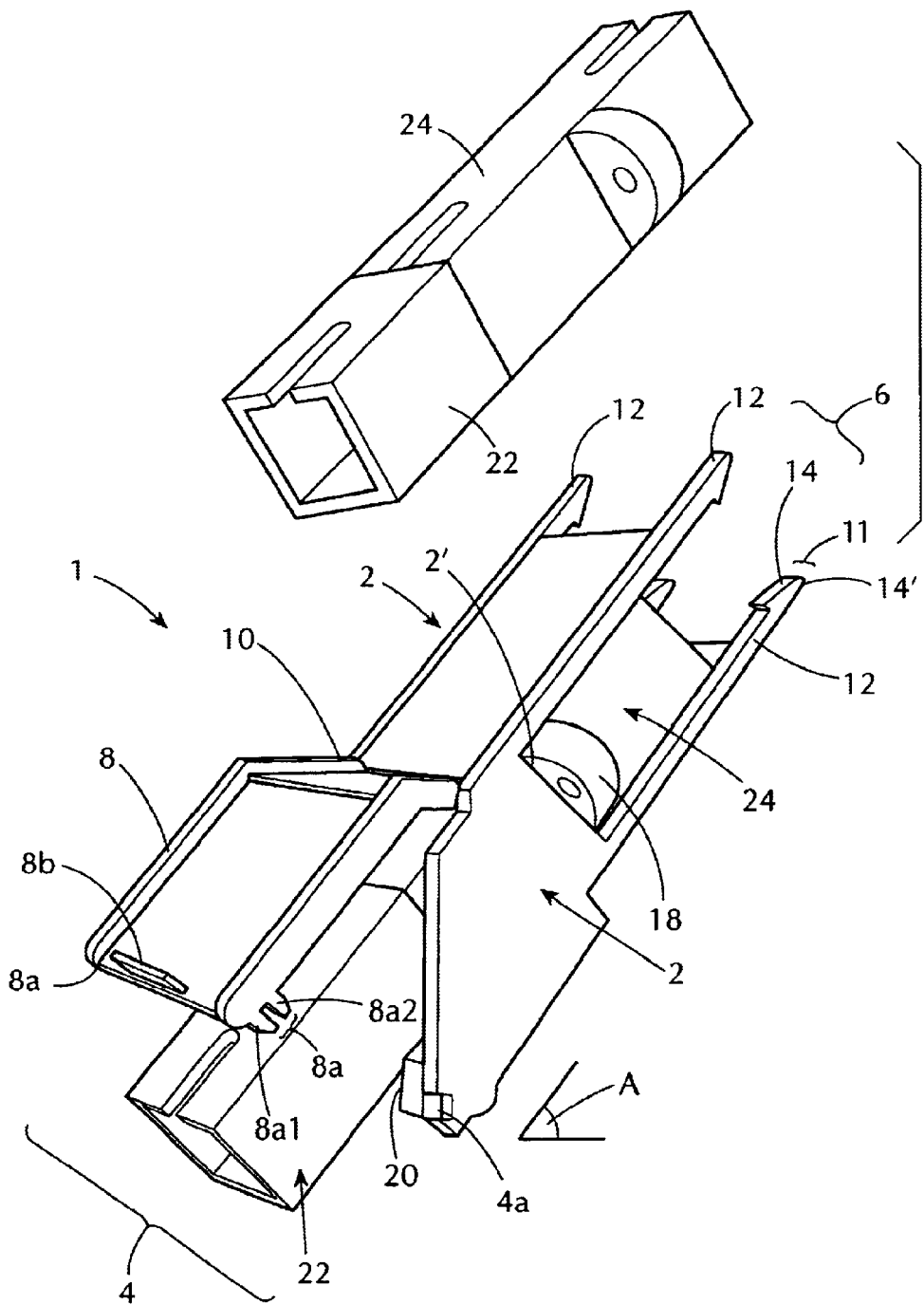
FIG. 1 is a perspective view of a bezel for connection of optical components according to the present invention.

Referring now to FIG. 1, a bezel 1 for facilitating connection of an attenuator 22 to an optical coupler 24 includes a housing 2, an end 6 for being received in a corresponding receiving area in an optical communication module within an opening in a panel housing optical fiber connections and the like. The housing 2 is a body that has a first peripheral end, at least one edge 2' of which engages with the optical coupler 24 at a corresponding edge or retaining tab 18 of the optical coupler 24 extending from a body portion of the optical coupler 24 (for convenience, only one edge 2' and one tab 18 are shown in the drawings).

The bezel may be manufactured from a variety of materials including metal and plastic, but is preferably made from plastic, and is preferably manufactured by injection molding.

The bezel 1 also includes an end 4 having a hinged cover 8, which conceals an opening exposing an end of an optical coupler 24 positioned in an interior portion within the bezel housing. The cover 8 abuts edges of the housing 2 forming a second peripheral end of the body of housing 2, when the cover 8 is in a closed position, and the housing 2 has at least one guiding member (structural abutment) 20 disposed along an interior wall of the housing 2, for guiding an external device, such as the attenuator 22, within the interior of the housing 2. For convenience, only a single guiding member 20 is shown in the drawings, although there may be a guiding member 20 disposed along both opposing interior walls of the housing 2.

The hinged portion 10 of the cover may be integral with the housing 2, or it may include an actual hinge, a half of which is included on the cover and the remaining half being positioned on an upper portion of the end 4 of the bezel.

The cover may also include locking tabs 8a. The tabs 8a include two halves 8a1 and 8a2 with ends having inclined surfaces that enable easy insertion into a corresponding opening 4a positioned adjacent end 4 of the bezel housing 2. When the cover is placed in a closed position to conceal the interior portion within the end 4, the two halves of the tabs 8a compress together. A force generated by the compression of the halves is placed on the sides of the openings 4a, allowing the cover to remain in a closed position.

The cover is easily opened by applying an outward force on lifting tab 8b. The outward force overcomes a frictional force created between each half of the locking tabs and the respective wall of the opening 4a, thereby allowing the cover to open and expose the interior of the bezel housing.

Adjacent end 6 of the bezel are several locking cams 11 positioned on the end of corresponding finger projections (projecting members) 12. Each projection 12 includes an end having an inclined portion 14 ending in a shoulder portion 14', wherein the inclined portion 14 and shoulder portion 14' of each projection 12 form a respective cam surface of the corresponding cam 11. The cams 11 are received in corresponding slots on a module within the panel, and lock thereto. The slots in the module surround an optical connector for connection to the optical coupler of the bezel. The cams 11 restrain the optical coupler in the bezel from linear movement away from optical connector of the optical module and also prevent the bezel from being pulled away from the panel, or dislodged in any way.

It will be appreciated by one of skill in the art, that the bezel cover in the cover in the closed position is preferably flush with a vertical access panel surface of an optical connection box. Thus, the housing of the bezel is connected with the optical module at a downward angle, shown as angle A with a horizontal reference in FIG. 2. Positioning the bezel at a downward angle relative to a vertical access panel helps to avoid any potential eye injury to a technician working with the coupler within the bezel. Accordingly, if the bezel housing was instead mounted substantially perpendicular to the access panel, a technician might accidentally look directly into the optical coupler, and thus the light path, within the bezel housing potentially damaging his vision. By mounting the bezel housing at a downward angle, the direction of light emanating from the optical coupler within the bezel housing is downward away from the eye level of a technician and toward the ground.

Figure 2:
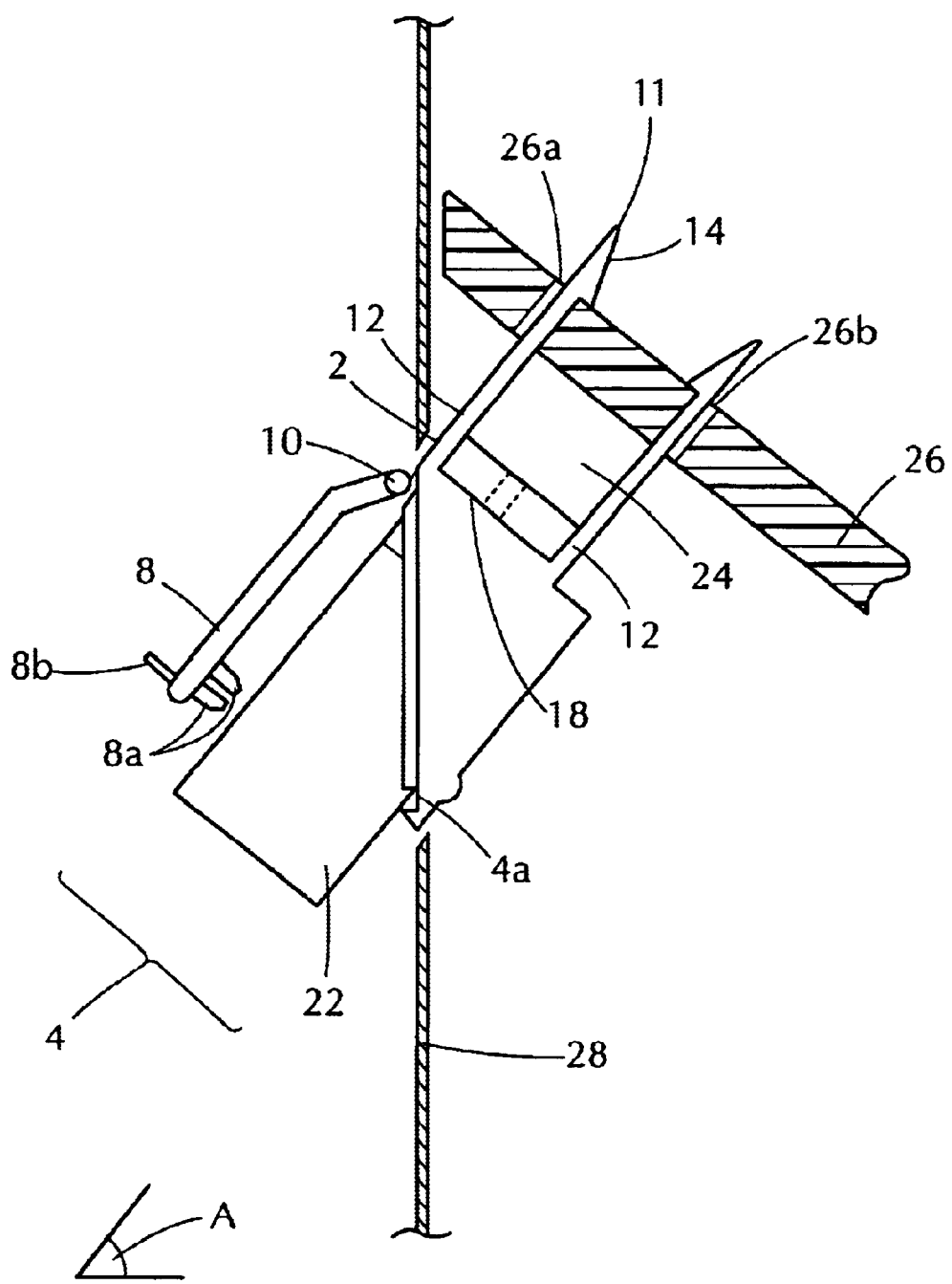
FIG. 2 is a side sectional view of the bezel according to the present invention.

FIG. 2 illustrates the bezel according to the present invention as assembled with an optical module 26 inside a panel 28. The locking cams 11 are received by corresponding slots 26a and 26b which allow the locking cams 11 to pass through and lock on the other side. The slots are positioned away from one another in the vertical direction as seen in FIG. 2 so that the distance between the inside walls of a pair of adjacent slots, 26a and 26b, is equal to the distance between the two corresponding projecting fingers 12 of the bezel. The slots are also formed so that the respective cam can easily fit through and lock on the other side.

As soon as the cams pass through the module wall, they lock into place, yielding an audible "snap" sound indicating that the bezel is locked into place. Thus, the bezel cannot be removed from outside the panel or the module.

Depending upon the bezel design, the front 4 of the bezel may snap into a cutout in the front panel of the optical connection box. When access to a particular optical module is required, the cover 8 is opened by pulling back on tab 8b, exposing the optical coupler. The external optical component may then be connected to the exposed end of the optical coupler to complete the communication connection.

This system is especially advantageous in connecting an attenuator to the optical module. Once an appropriate attenuator is selected for a particular application, one end of the attenuator is plugged onto an external optical connector, the bezel cover is lifted, and then the other end of the attenuator is plugged into the optical coupler positioned within the bezel housing.

It is to be understood that the above-described arrangements are simply illustrative of the invention. Other arrangements may be devised by those skilled in the art which will embody the principles of the invention and fall within the spirit and scope thereof.

What is claimed is:

1. A bezel for facilitating the connection between an external device positioned on one side of a communication panel and a module located on the other side of said panel, said panel having an opening for receiving said bezel, said bezel comprising:

a housing, said housing defining an interior portion;

a first open end for insertion into said opening and said module, wherein said first open end receives a first communication connection from said module for connection with said external device; and a second open end having a removable cover, wherein said second open end receives at least a second communication connection from said external device for connection with said first communication connection, without substantially disrupting operation of said module, wherein said external device comprises an optical attenuator.

2. The bezel according to claim 1, wherein said interior portion houses an optical coupler for connecting an optical connector of said module to an optical connector of said external device.

3. The bezel according to claim 1, wherein said optical coupler comprises an SC optical coupler.

4. The bezel according to claim 1, wherein said cover is hinged to a body of said housing.

5. The bezel according to claim 1, wherein said cover includes a locking member for locking said cover in a closed position.

6. The bezel according to claim 1, wherein said first open end includes a plurality of projecting members, each said projecting member including an end having an inclined portion ending in a shoulder portion, said inclined portion and said shoulder portion forming at least a portion of a cam surface.

7. The bezel according to claim 6, wherein at least part of said cam surface substantially locks said housing to said module, thereby maintaining at least a portion of said optical coupler in a position within the interior of said housing.

8. The bezel according to claim 2, wherein said housing includes a side having an edge for engagement of an edge of said optical coupler.

9. The bezel according to claim 1, wherein said second open end includes a side having a guiding member for guiding at least the second communication connection from said external device within said interior of said housing.

10. The bezel according to claim 1, wherein said second open end is flush with said panel.

11. The bezel according to claim 1, wherein said housing is positioned at an angle relative to said panel.

12. A bezel for facilitating the connection between an external device positioned on one side of a communication panel and a module located on the other side of said panel, said panel having an opening for receiving said bezel, said bezel comprising:

a housing, said housing defining an interior portion;

a first open end for insertion into said opening and said module, wherein said first open end receives a first communication connection from said module for connection with said external device; and a second open end having a removable cover, wherein said second open end receives a second communication connection from said external device for connection with said first communication connection, wherein said second open end is flush with said panel.

13. The bezel according to claim 12, wherein the external device comprises an attenuator.

14. The bezel according to claim 12, wherein said cover is hinged to a body of said housing.

15. The bezel according to claim 12, wherein said cover includes a locking member for locking said cover in a closed position.

16. The bezel according to claim 12, wherein said first open end includes a plurality of projecting members, each said projecting member including an end having an inclined portion ending in a shoulder portion, said inclined portion and said shoulder portion forming at least a portion of a cam surface, and wherein at least part of said cam surface substantially locks said housing to said module, thereby maintaining at least a portion of said optical coupler in a position within the interior of said housing.

17. The bezel according to claim 5, wherein said housing is positioned at an angle relative to said panel.

18. A fiber optical connection panel comprising:
a communication module including a fiber optical connector for making a connection with an external optical device;
a connection surface positioned adjacent said module, said surface having an opening corresponding to said fiber optical connector; and
a bezel positioned within said opening for facilitating the optical connection between said fiber optical connector and said external optical device, said bezel comprising:
a housing, said housing defining an interior portion;
a first open end for insertion into said opening and said module, wherein said first open end receives said fiber optical connector from said module for connection with said external optical device; and
a second open end having a removable cover, wherein said second open end receives at least a portion of said external optical device for connection with said fiber optical connector of said module, and
wherein said second open end is flush with said panel.

19. The fiber optical connection panel according to claim 18, wherein said interior portion houses an optical coupler for connecting the fiber optical connector of said module to an optical connector of said external optical device.

20. The fiber optical connection panel according to claim 18, wherein said external optical device comprises an attenuator.

21. The fiber optical connection panel according to claim 18, wherein said optical coupler comprises an SC optical coupler.

22. The fiber optical connection panel according to claim 18, wherein external device comprises an attenuator.

23. The fiber optical connection panel according to claim 18, wherein said cover is hinged to a body of said housing.

24. The fiber optical connection panel according to claim 18, wherein said cover includes a locking member for locking said cover in a closed position.

25. The fiber optical connection panel according to claim 18, wherein said first open end includes a plurality of projecting members, each said projecting member including an end having an inclined portion ending in a shoulder portion, said inclined portion and said shoulder portion forming at least a portion of a cam surface, and wherein at least part of said cam surface substantially locks said housing to said module, thereby maintaining at least a portion of said optical coupler in a position within the interior of said housing.

26. The fiber optical connection panel according to claim 18, wherein said housing is positioned at an angle relative to said panel.

27. A bezel, comprising:
a housing structure having a body with a first peripheral end and a second, opposite peripheral end; and
a plurality of projecting portions extending from the first peripheral end of said body, each projecting portion having a distal end forming a structural tab for being lockingly engaged in a corresponding slot of an external optical module,
wherein said body and said projecting portions define, in combination, a volume extending from the second, opposite peripheral end through an interior of said body to the distal ends of said projecting portions, for receiving at least a portion of an optical attenuator therein, for being optically coupled to the external optical module.

28. A bezel as set forth in claim 27, further comprising a cover mechanically coupled at or adjacent the second, opposite peripheral end of said body, and being manipulable for being orientated in either a closed position to provide covering at the second, opposite peripheral end of said body, or in a selected open position.

29. A bezel as set forth in claim 28, wherein said cover includes protruding tab portions adapted to be lockingly engaged in corresponding slot portions defined in the second, opposite peripheral end of said body, when said cover is orientated in the closed position.

30. A bezel as set forth in claim 28, wherein the external optical module is disposed inside a communication panel, and is accessible externally opening in the communication panel, and wherein said cover is substantially flush with a surface of the communication panel when said cover is orientated in the closed position.

31. A bezel as set forth in claim 27, wherein said housing structure includes at least one structural abutment extending along at least part of an interior wall of said body defining part of the volume, and said at least one structural abutment directionally guides at least a portion of the optical attenuator when received in the volume.

32. A bezel as set forth in claim 26, wherein the volume also receives an optical coupler adapted to couple the optical attenuator to the optical module, the optical coupler including a body portion and retaining tabs extending from opposite sides of the body portion, and wherein the retaining tabs abut against the first peripheral end of said body of said housing structure to retain the optical coupler in position when said projecting portions are lockingly engaged in the slots of the external optical module.

33. A method for optically coupling an optical attenuator to an optical communication module, comprising the steps of:
fixedly attaching a plurality of projecting portions of a mechanical bezel to the optical communication module, to cause a first end of an optical coupler disposed in at least an interior portion of the mechanical bezel to become optically coupled to the optical communication module, wherein the bezel comprises a housing structure having a body with a first peripheral end and a second, opposite peripheral end, and the plurality of projecting portions extend from the first peripheral end of the body; and
optically coupling a selected optical attenuator to a second end of the optical coupler, to thereby optically couple the optical attenuator to the optical communication module through the optical coupler without substantially disrupting operation of the optical communication module.

34. A method as set forth in claim 33, wherein the fixedly attaching disposes the mechanical bezel in a downward-facing orientation.

35. A method for optically coupling an optical attenuator to a communication module, at least a portion of the module being disposed on an internal side of a panel, comprising the steps of:

positioning the optical attenuator on an external side of the panel, the optical attenuator being optically disconnected from the module;

directing the optical attenuator towards the panel and towards a communication connection from the module; and connecting the optical attenuator to the communication connection to establish an optical connection between the optical attenuator and the module, wherein the optical connection is facilitated by an opening in the panel that provides access to the communication connection for making the optical connection.

36. A method as set forth in claim 35, wherein the step of connecting the optical attenuator to the communication connection is executed without disrupting the module.

37. A method as set forth in claim 35, wherein the step of connecting the optical attenuator to the communication connection is executed without placing the module out of service.

38. A method as set forth in claim 35, wherein the communication connection comprises an optical connector.

39. A method as set forth in claim 38, wherein the optical connector comprises a SC connector.

40. A method as set forth in claim 35, wherein the communication connection comprises an optical coupler.

41. A method as set forth in claim 40, wherein the optical coupler comprises a SC coupler.

42. A method as set forth in claim 35, further comprising the step of connecting an external optical connector to the optical attenuator to establish an optical connection between the external optical connector and the module through the optical attenuator.

43. A method as set forth in claim 42, wherein the external optical connector comprises a SC connector.

44. A method for optically coupling an optical attenuator to a communication module, at least a portion of the module being disposed on an internal side of a panel, comprising the steps of:

positioning the optical attenuator on an external side of the panel; and connecting the optical attenuator to a communication connection from the module to establish an optical connection between the optical attenuator and the module, wherein the optical connection is facilitated by an opening in the panel that provides access from the external side of the panel to the communication connection for making the optical connection.

45. A method as set forth in claim 44, wherein the step of connecting the optical attenuator to the communication connection is executed without disrupting the module.

46. A method as set forth in claim 44, wherein the step of connecting the optical attenuator to the communication connection is executed without placing the module out of service.

47. A method as set forth in claim 44, wherein the communication connection comprises an optical connector.

48. A method as set forth in claim 47, wherein the optical connector comprises a SC connector.

49. A method as set forth in claim 44, wherein the communication connection comprises an optical coupler.

50. A method as set forth in claim 49, wherein the optical coupler comprises a SC coupler.

51. A method as set forth in claim 44, further comprising the step of connecting an external optical connector to the optical attenuator to establish an optical connection between the external optical connector and the module through the optical attenuator.

52. A method as set forth in claim 51, wherein the external optical connector comprises a SC connector.

\* \* \* \* \*

UNITED STATES PATENT AND TRADEMARK OFFICE
CERTIFICATE OF CORRECTION

PATENT NO.     : 6,695,485 B1
DATED          : February 24, 2004
INVENTOR(S)    : Jeffrey Estrella et al.

It is certified that error appears in the above-identified patent and that said Letters Patent is hereby corrected as shown below:

Column 3,
Line 19, "way." should read -- way.
    As can be appreciated in view of Figs. 1 and 2, the body of the housing 2 and the projections 12 define, in combination, a volume extending from the second peripheral end of the body of the housing 2, through an interior of the body, to distal ends of the projections 12. The volume can receive at least a portion of each of the optical coupler 24 and attenuator 22 therein. --.

Column 5,
Line 21, "claim 5," should read -- claim 12, --; and
Line 55, "external" should read -- said external --.

Column 6,
    Line 32-37, "30. A bezel as set forth in claim 28, wherein the external optical module is disposed inside a communication panel, and is accessible externally opening in the communication panel, and wherein said cover is substantially flush with a surface of the communication panel when said cover is orientated in the closed position." should read
    -- 30. A bezel, comprising:
        a housing structure having a body with a first peripheral end and a second, opposite peripheral end;
        a plurality of projecting portions extending from the first peripheral end of said body, each projecting portion having a distal end forming a structural tab for being lockingly engaged in a corresponding slot of an external optical module,
        wherein said body and said projecting portions define, in combination, a volume extending from the second, opposite peripheral end through an interior of said body to the distal ends of said projecting portions, for receiving at least a portion of an optical attenuator therein, for being optically coupled to the external optical module; and
        a cover mechanically coupled at or adjacent the second, opposite peripheral end of said body, and being manipulable for being orientated in either a closed position to provide covering at the second, opposite peripheral end of said body, or in a selected open position,
        wherein the external optical module is disposed inside a communication panel, and is accessible externally through an opening in the communication panel, and wherein said cover is substantially flush with a surface of the communication panel when said cover is orientated in the closed position. --; and
    Line 38-43, "31. A bezel as set forth in claim 27, wherein said housing structure includes at least one structural abutment extending along at least part of an interior wall of said body defining part of the volume, and said at least one structural abutment directionally guides at least a portion of the optical attenuator when received in the volume." should read

UNITED STATES PATENT AND TRADEMARK OFFICE
CERTIFICATE OF CORRECTION

PATENT NO.    : 6,695,485 B1
DATED         : February 24, 2004
INVENTOR(S)   : Jeffrey Estrella et al.

It is certified that error appears in the above-identified patent and that said Letters Patent is hereby corrected as shown below:

Column 6 cont.,
-- 31. A bezel, comprising:
a housing structure having a body with a first peripheral end and a second, opposite peripheral end; and
a plurality of projecting portions extending from the first peripheral end of said body, each projecting portion having a distal end forming a structural tab for being lockingly engaged in a corresponding slot of an external optical module,
wherein said body and said projecting portions define, in combination, a volume extending from the second, opposite peripheral end through an interior of said body to the distal ends of said projecting portions, for receiving at least a portion of an optical attenuator therein, for being optically coupled to the external optical module, and
wherein said housing structure includes at least one structural abutment extending along at least part of an interior wall of said body defining part of the volume, and said at least one structural abutment directionally guides at least a portion of the optical attenuator when received in the volume. --; and
Line 44-52, "32. A bezel as set forth in claim 26, wherein the volume also receives an optical coupler adapted to couple the optical attenuator to the optical module, the optical coupler including a body portion and retaining tabs extending from opposite sides of the body portion, and wherein the retaining tabs abut against the first peripheral end of said body of said housing structure to retain the optical coupler in position when said projecting portions are lockingly engaged in the slots of the external optical module." should read
-- 32. A bezel, comprising:
a housing structure having a body with a first peripheral end and a second, opposite peripheral end; and
a plurality of projecting portions extending from the first peripheral end of said body, each projecting portion having a distal end forming a structural tab for being lockingly engaged in a corresponding slot of an external optical module,
wherein said body and said projecting portions define, in combination, a volume extending from the second, opposite peripheral end through an interior of said body to the distal ends of said projecting portions, for receiving at least a portion of an optical attenuator therein, for being optically coupled to the external optical module, and

UNITED STATES PATENT AND TRADEMARK OFFICE
CERTIFICATE OF CORRECTION

PATENT NO. : 6,695,485 B1
DATED : February 24, 2004
INVENTOR(S) : Jeffrey Estrella et al.

It is certified that error appears in the above-identified patent and that said Letters Patent is hereby corrected as shown below:

Column 6 cont.,
      wherein the volume also receives an optical coupler adapted to couple the optical attenuator to the optical module, the optical coupler including a body portion and retaining tabs extending from opposite sides of the body portion, and wherein the retaining tabs abut against the first peripheral end of said body of said housing structure to retain the optical coupler in position when said projecting portions are lockingly engaged in the slots of the external optical module. --.

Signed and Sealed this

Seventh Day of September, 2004

JON W. DUDAS
*Director of the United States Patent and Trademark Office*